(12) United States Patent
Chen

(10) Patent No.: US 7,745,777 B2
(45) Date of Patent: Jun. 29, 2010

(54) ACTIVE IMAGING SYSTEM THAT RECAPTURES AND PROCESSES A REFLECTED ILLUMINATION BEAM

(75) Inventor: Bo Su Chen, Torrance, CA (US)

(73) Assignee: Northrop Grumman Space and Mission Systems Corp., Los Angeles, CA (US)

( * ) Notice: Subject to any disclaimer, the term of this patent is extended or adjusted under 35 U.S.C. 154(b) by 0 days.

(21) Appl. No.: 12/046,027

(22) Filed: Mar. 11, 2008

(65) Prior Publication Data

US 2009/0231704 A1 Sep. 17, 2009

(51) Int. Cl.
*G02F 1/01* (2006.01)
*G01S 13/00* (2006.01)

(52) U.S. Cl. ............................ 250/225; 342/188
(58) Field of Classification Search ................. 250/225, 250/216; 342/188, 361
See application file for complete search history.

(56) References Cited

U.S. PATENT DOCUMENTS

| | | | |
|---|---|---|---|
| 4,712,880 A | 12/1987 | Shirasaki | |
| 4,988,170 A | 1/1991 | Buhrer | |
| 5,122,895 A | 6/1992 | Takanashi et al. | |
| 5,198,607 A | 3/1993 | Livingston et al. | |
| 5,600,434 A | 2/1997 | Warm et al. | |
| 6,265,704 B1 | 7/2001 | Livingston et al. | |
| 6,493,140 B1 | 12/2002 | Li et al. | |
| 6,809,307 B2 | 10/2004 | Byren et al. | |
| 6,945,651 B2 | 9/2005 | Yatsu et al. | |
| 2002/0167642 A1* | 11/2002 | Jones et al. | 351/206 |
| 2005/0134960 A1* | 6/2005 | Fujita et al. | 359/498 |
| 2005/0271111 A1* | 12/2005 | Rieger et al. | 372/69 |
| 2006/0232762 A1* | 10/2006 | Jokinen | 356/5.01 |

\* cited by examiner

*Primary Examiner*—Thanh X Luu
(74) *Attorney, Agent, or Firm*—Tarolli, Sundheim, Covell & Tummino LLP (57) ABSTRACT

In accordance with yet another aspect of the present invention, an active imaging system is provided for imaging a target of interest. An imaging assembly includes a light source and an optical assembly comprising a plurality of passive optical components. The optical assembly divides received light into a first beam, having a first polarization and a second beam, having a second, orthogonal polarization, directs the first and second beam along respective first and second optical paths within the optical assembly, and recombines the first and second beams into a combined beam. A sensor detects the combined beam.

14 Claims, 5 Drawing Sheets

ACTIVE IMAGING SYSTEM THAT RECAPTURES AND PROCESSES A REFLECTED ILLUMINATION BEAM

TECHNICAL FIELD

The present invention relates generally to optical systems, and more specifically to efficiently recapture and processing of a reflected illumination beam in an active imaging system.

BACKGROUND OF THE INVENTION

A laser weapon system can include a tracking illuminator laser for locating and tracking a moving object, such as a missile or vehicle, a beacon illuminator laser for determining the wavefront aberrations encountered along the optical path to the object, and a high energy laser for detonating or disabling the tracked object. The laser wavelengths can be selected to be slightly different from each other in order to use a shared aperture element to combine the laser trains for outgoing beams delivery. When the illuminator lasers engage a target, the reflected laser light is depolarized depending on laser polarization, target surface roughness, angle of incidence and atmospheric turbulence. The reflected track and beacon laser signals are captured by on board sensors for target tracking and wavefront correction. To simplify boresighting between the several beams and eliminate anisoplanatic effects, it is desirable that the outgoing tracking and beacon illuminator lasers and their respective return signals share the common optical path. Unfortunately, this can complicate the separation of the incoming signals from outgoing beams.

SUMMARY OF THE INVENTION

In accordance with one aspect of the present invention, an apparatus is provided for detecting a beam of light reflected from a region of interest. A light source produces a light beam having a first polarization state. A first polarization beam splitter directs the light beam along a first optical path and allows light having a second polarization state, orthogonal to the first polarization state, to pass. An optical polarization modulator, located along the first optical path, applies a net rotation of ninety degrees to the polarization of light passing through the optical polarization modulator in a first direction and applies a net rotation of zero degrees to the polarization of light passing through the optical polarization modulator in a second direction. The first polarization beam splitter directs the light beam to the optical polarization modulator. A second polarization beam splitter, positioned along the first optical path such that the optical polarization modulator is between the first polarization beam splitter and the second polarization beam splitter, allows incident light having the second polarization state to pass onto the optical polarization modulator and directs incident light having the first polarization state along a second optical path.

In accordance with another aspect of the present invention, a method is provided for imaging a region of interest. Light reflected from a moving object is received at an aperture. The received light is split according to its polarization state as to direct a first portion of the received light having a first polarization state to a first optical path and to direct a second portion of the received light having a second polarization state to a second optical path. The polarization state of the first portion of the received light is rotated from a first polarization state to a second polarization state. The first portion of the received light and the second portion of the received light are recombined at a sensor.

In accordance with yet another aspect of the present invention, an active imaging system is provided for imaging a target of interest. An imaging assembly includes a light source and an optical assembly comprising a plurality of passive optical components. The optical assembly divides received light into a first beam, having a first polarization and a second beam, having a second, orthogonal polarization, directs the first and second beam along respective first and second optical paths within the optical assembly, and recombines the first and second beams into a combined beam. A sensor detects the combined beam.

In accordance with still another aspect of the present invention, a method is provided for imaging a region of interest. A light beam is produced having a first polarization state on a first optical path. The polarization state of the light beam is rotated from a first polarization state to a second polarization state. The light beam is projected at a moving object through an aperture. Light reflected from the moving object is received at the aperture. The received light is split according to its polarization state as to direct a first portion of the received light having the second polarization state to the first optical path and to direct a second portion of the received light having the first polarization state to a second optical path. The first portion of the received light and the second portion of the received light are recombined at a sensor.

DETAILED DESCRIPTION OF INVENTION

The present invention relates to systems and methods for efficiently recapturing and processing a reflected illumination beam in an active imaging system. An optical assembly, in accordance with an aspect of the present invention, includes a plurality of passive optical components that separate incoming light into two orthogonally polarized components and routes one of the components along the same optical path as a transmitted signal. The optical assembly finds particular application to high energy laser weapon systems, although it will be appreciated that it can be used in any active imaging system, sensor, or optical communications system. Since the device used only passive optical components to separate and convert light polarizations, it is possible to achieve integration of outgoing laser trains and return light collection with high efficiency. The surface Fresnel reflections of optical components are the only losses experienced within the optical assembly, and even this loss can be significantly mitigated by anti-reflection coatings. This efficiency allows for the use of illuminator lasers with significantly less power than prior art systems to obtain the same signal-to-noise ratio at the sensor. Further, the use of passive optical components allows the device to be both inexpensive and highly reliable.

Figure 1:
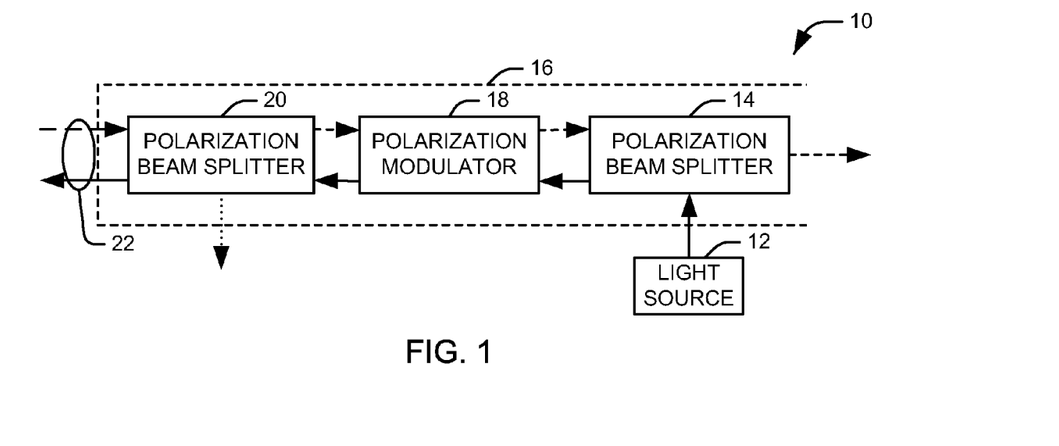
FIG. 1 illustrates a functional block diagram of an active illumination system in accordance with an aspect of the present invention.

FIG. 1 illustrates an optical assembly 10 for an active illumination system in accordance with an aspect of the present invention. The illustrated assembly 10 provides means for illuminating a target region of interest and efficiently receiving return light from the illuminated target region. The assembly 10 comprises a light source 12 that produces a polarized light beam to illuminate a region of interest. For example, the light source 12 can comprise a laser or other appropriate device for producing light of a single polarization.

The polarized light beam can be directed to a first polarization beam splitter 14 that reflects light having a first polarization state and allows light having a second polarization state to pass freely. For the purposes of the illustrated assembly 10, the first polarization beam splitter 14 can be conceptualized as a router that routes incident light along one of two different possible paths according to its polarization. The relative orientation of the light source 12 and the first polarization beam splitter 14 as well as the polarization state of the polarized light beam can be selected such that the polarized light from the light source 12 is routed onto a first optical path 16.

The first optical path 16 can include an optical polarization modulator 18 that provides non-reciprocal rotation of polarized light. The optical polarization modulator 18 applies a net rotation of ninety degrees to the polarization of light passing through the optical polarization modulator in a first direction and applies a net rotation of zero degrees to the polarization of light passing through the optical polarization modulator in a second direction. It will be appreciated that the orientation of the optical polarization modulator 18 within the system can vary to either rotate light transmitted from the assembly 10 through the first optical path 16 or to rotate light received at the assembly through the first optical path. For the purpose of illustration, the following discussion will assume that the optical polarization modulator 18 is configured to rotate light transmitted through the optical path, so the light beam reflected from the first polarization beam splitter 14 is rotated during passage through the optical polarization modulator, but it will be appreciated that other configurations (See, e.g., FIG. 4) are possible. Accordingly, the polarized light beam reflected from the first polarization beam splitter 14 is rotated at the optical polarization modulator 18, converting the polarized light beam from the first polarization state to a second polarization state.

After passing through the optical polarization modulator 18, the polarized light is directed onto a second polarization beam splitter 20. The second polarization beam splitter 20 reflects light having a first polarization state and allows light having a second polarization state to pass freely. The second polarization beam splitter 20 can be oriented such that the polarized light from the light source 12 passes through the beam splitter into an aperture 22 that is oriented toward the region of interest to illuminate the region of interest with polarized light. The polarized light is reflected from the region of interest, and received at the aperture 22.

Depending on the nature of the region of interest, the reflected light can be significantly depolarized. Specifically, uneven texture of the target surface, atmospheric turbulence, and non-normal angles of incidence to the target can contribute to depolarization of the reflected light. Accordingly, the return light received at the aperture can comprise a mix of the first and second polarization states or even a random polarization. The returned light at the aperture 22 is directed to the second polarization beam splitter 20, where it is split into a first component, having the first polarization state, and a second component, having the second polarization state. The first component is reflected to a second optical path, while the second component passes through the second polarization beam splitter 20 to the first optical path 16. The second polarization component is directed onto the optical polarization modulator and passes through the optical polarization modulator power unchanged to the first polarization beam splitter 14. Since the output of the optical polarization modulator is in the second polarization state, it passes through the first polarization beam splitter 14 to continue along the first optical path.

Figure 2:
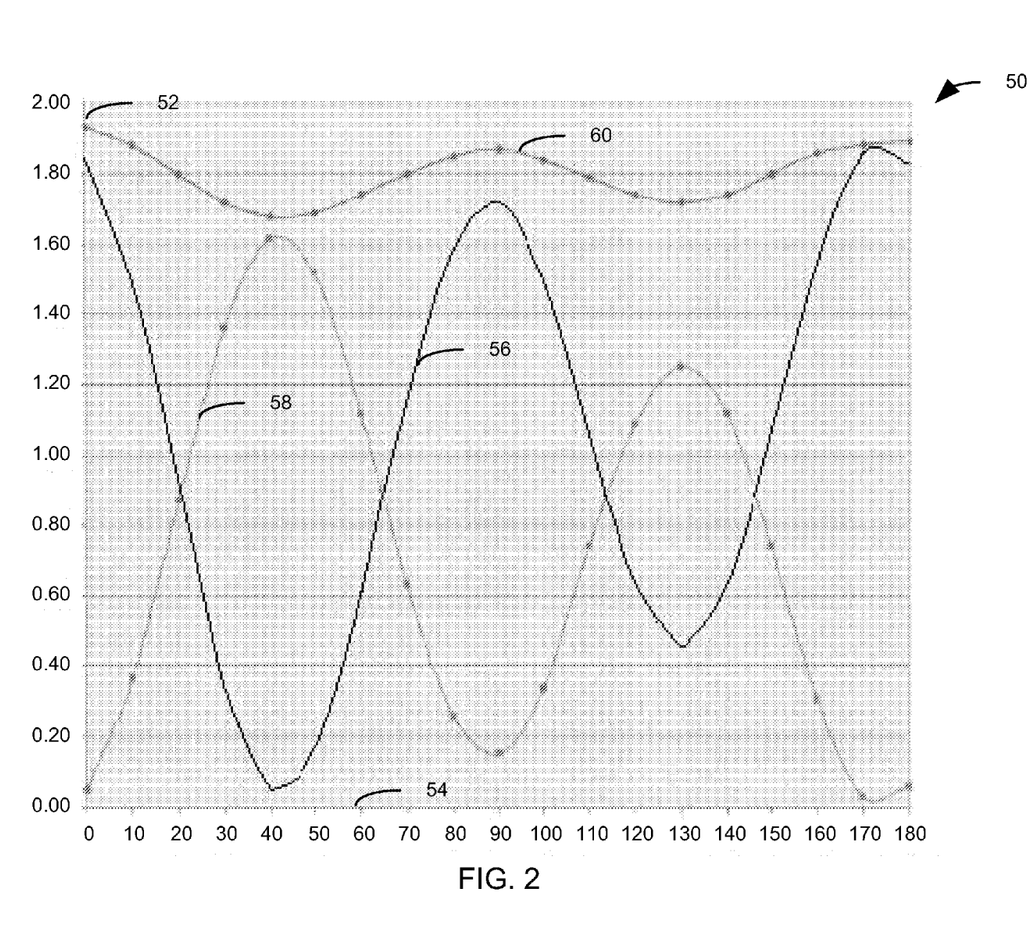
FIG. 2 is a chart illustrating a relative power of a signal, represented on a vertical axis, as a function of the rotational angle of a half-wave plate, represented on a horizontal axis in degrees, used to apply polarization to the signal as part of an experimental arrangement.

FIG. 2 is a chart 50 illustrating a relative power of a signal, represented on a vertical axis 52, as a function of the rotational angle of a half-wave plate, represented on a horizontal axis 54 in degrees, used to apply polarization to the signal as part of an experimental arrangement. A first plot line 56 represents the power of a vertically polarized portion of the signal after passage through a second optical path. A second plot line 58 represents the power of a horizontally polarized portion of the signal after passage through a first optical path. It will be appreciated that the power of the two polarized components varies significantly across the various angles of rotation of the half-wave plate. A total power received by an optical assembly in accordance with an aspect of the present invention is illustrated as a third plot line 60. It will be appreciated that despite the large variance in the power of the two polarized components 56 and 58, the total power 60 varies only slightly, remaining within approximately five percent of an average value. As this chart demonstrates, the optical assembly is effective in controlling variance in return power regardless of the relative power of the various components of a reflected, depolarized signal.

Figure 3:
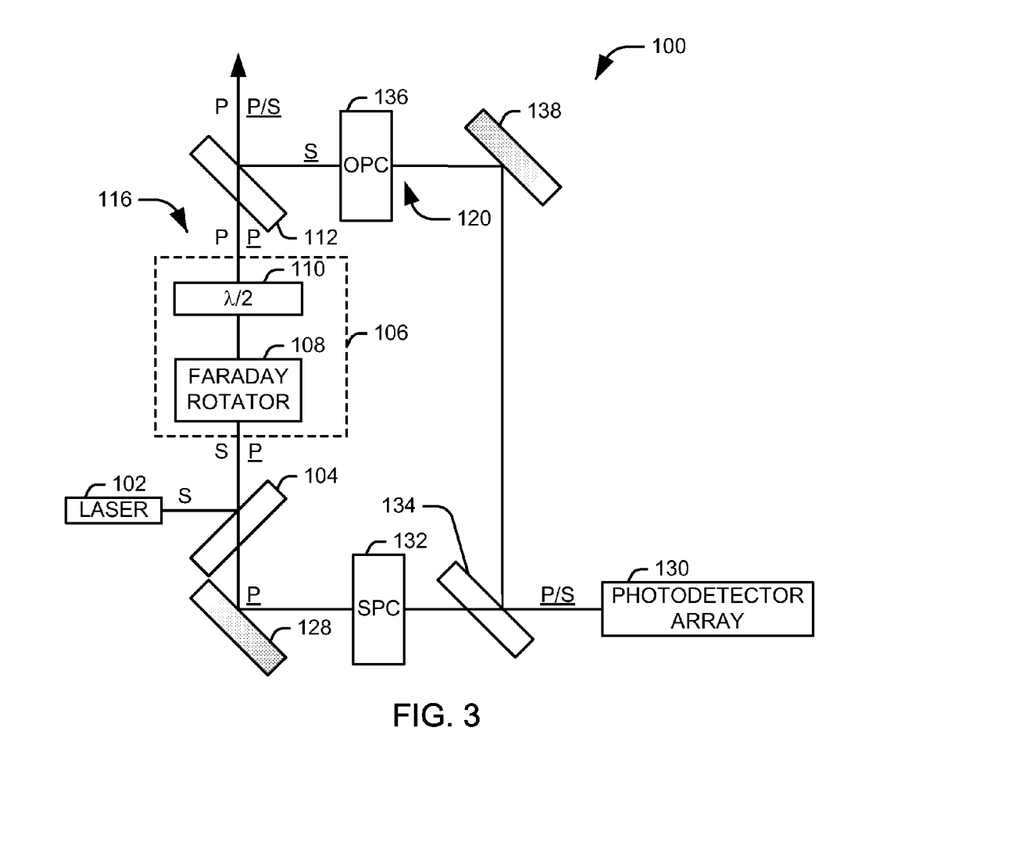
FIG. 3 illustrates one implementation of an imaging system in accordance with an aspect of the present invention.

FIG. 3 illustrates one implementation of an imaging system 100 in accordance with an aspect of the present invention. The illustrated system 100 allows the return light and the transmitted light to utilize the substantially the same optical path while preserving both the vertically polarized and horizontally polarized components in the return light. For ease of illustration, the polarization state of the light at each point in the system 100 is denoted by a capital "S" or "P", representing vertical and horizontal polarization states respectively, underlined capitals representing returned light, and unmodified capitals representing transmitted light.

In the illustrated system, an illumination laser 102 provides a vertically polarized light beam to a first polarization beam splitter 104. The first polarization beam splitter 104 is configured to reflect vertically polarized light while remaining substantially transparent to horizontally polarized light, and the first polarization beam splitter can be configured to reflect the light beam to an optical polarization modulator 106. The optical polarization modulator 106 comprises a Faraday rotator 108 that applies a forty-five degree rotation in a first direction to the transmitted light beam. A half-wave plate 110 is aligned with an appropriate optical axis such that it provides a second forty-five degree rotation in the first direction, such that the output of the optical polarization modulator 106 is a horizontally polarized beam.

The horizontally polarized beam output from the optical polarization modulator 106 is provided to a second polarization beam splitter 112 that is configured to reflect vertically polarized light while remaining substantially transparent to horizontally polarized light. The horizontally polarized beam passes through the second polarization beam splitter 112 and can be directed toward a target location of interest. The polarized light reflects from the target location, illuminating the target, but characteristics of the target surface, such as motion of the surface and uneven texture, can cause depolarization of the reflected light. Accordingly, the reflected light can be expected to comprise a mix of both horizontally and vertically polarized light.

Light reflected from the target location is received at the second polarization beam splitter 112 and split into a horizontally polarized component that is returned along the first optical path 116 and a vertically polarized component that is directed along a second optical path 120. The horizontally polarized component is transmitted through the second polarization beam splitter 112 to the optical polarization modulator 106. As before, the half-wave plate 110 provides a forty-five degree rotation in a first direction to the horizontally polarized component, but the Faraday rotator 108 is a non-reciprocal device, and applies a forty-five degree rotation in a second, opposing direction to the transmitted light beam, such that the output of the polarization modulator 106 remains a horizontally polarized beam.

The horizontally polarized beam passes through the first polarization beam splitter to reflect from a first mirror 128, aligning the beam with a photodetector array 130. The beam is directed to a static phase compensator 132 that compensates for possible wavefront distortion in the outgoing beam caused by the Faraday rotator 108. The beam is then directed to a third polarization beam splitter 134 that that is configured to reflect vertically polarized light while remaining effectively transparent to horizontally polarized light. The horizontally polarized beam passes through the third polarization beam splitter 134.

The vertically polarized component of the light reflected from the target location is directed to an optical path compensator 136 that adjusts the phase of the vertically polarized component to account for differences in the path lengths of the first optical path 116 and the second optical path 120. The path adjusted beam is then reflected from a second mirror 138 to align the beam with the third polarization beam splitter 134. Since the beam is vertically polarized, it reflects from the third polarization beam splitter 134 and is recombined with the horizontally polarized component. The recombined beam is then received at the detector 130, where one or more characteristics of the target location or the intervening atmosphere can be determined from the received light.

Figure 4:
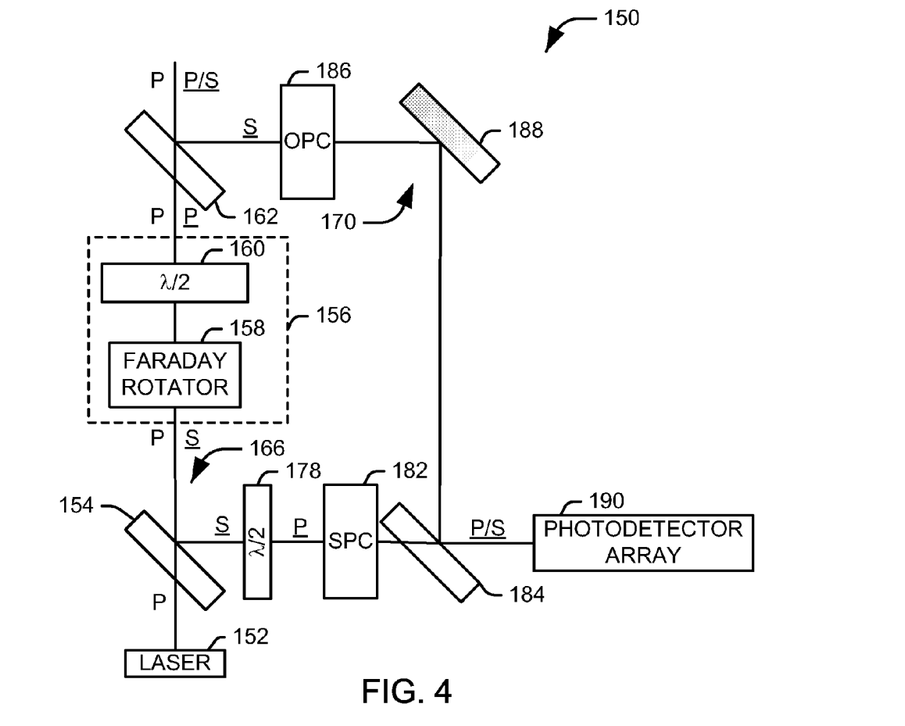
FIG. 4 illustrates a second implementation of an imaging system in accordance with an aspect of the present invention.

FIG. 4 illustrates a second implementation of an imaging system 150 in accordance with an aspect of the present invention. The illustrated system 150 allows the return light and the transmitted light to utilize the substantially the same optical path while preserving both the vertically polarized and horizontally polarized components in the return light. For ease of illustration, the polarization state of the light at each point in the system 150 is demoted by a capital "S" or "P", representing vertical and horizontal polarization states respectively, underlined capitals representing returned light, and unmodified capitals representing transmitted light.

In the illustrated system, an illumination laser 152 provides a horizontally polarized light beam to a first polarization beam splitter 154. The first polarization beam splitter 154 is configured to reflect vertically polarized light while remaining substantially transparent to horizontally polarized light, and the first polarization beam splitter can be configured to allow the light beam to pass through onto an optical polarization modulator 156. The optical polarization modulator 156 comprises a Faraday rotator 158 that applies a forty-five degree rotation in a first direction to the horizontally polarized component and a first half-wave plate 160 that is aligned with an appropriate optical axis to provide a forty-five degree rotation in a second, opposing direction to the transmitted light beam such that the output of the optical polarization modulator 156 remains a horizontally polarized beam.

The horizontally polarized beam output from the optical polarization modulator 156 is provided to a second polarization beam splitter 162 that is configured to reflect vertically polarized light while remaining effectively transparent to horizontally polarized light. The horizontally polarized beam passes through the second polarization beam splitter 162 and can be directed toward a target location of interest. The polarized light reflects from the target location, illuminating the target, but characteristics of the target surface, such as motion, uneven texture, etc. can cause depolarization of the reflected light. Accordingly, the reflected light can be expected to comprise a mix of both horizontally and vertically polarized light.

Light reflected from the target location is received at the second polarization beam splitter 162 and split into a horizontally polarized component that is returned along the first optical path 166 and a vertically polarized component that is directed along a second optical path 170. The horizontally polarized component is transmitted through the second polarization beam splitter 162 to the optical polarization modulator 156. The first half-wave plate 160 provides a forty-five degree rotation in a first direction, while the Faraday rotator 158, which is a non-reciprocal rotator, applies a forty-five degree rotation in the same direction, such that the output of the polarization modulator 156 is a vertically polarized beam.

The vertically polarized beam reflects from the first polarization beam splitter 154 and is directed to a second half-wave plate 178. The second half wave plate 178 provides a full ninety degree rotation to the vertically polarized beam to provide a horizontally polarized beam. The horizontally polarized beam is then provided to a static phase compensator 182 that compensates for possible wavefront distortion in the outgoing beam caused by the Faraday rotator 158. The beam is then directed to a third polarization beam splitter 184 that that is configured to reflect vertically polarized light while remaining substantially transparent to horizontally polarized light. The horizontally polarized beam passes through the third polarization beam splitter 184.

The vertically polarized component of the light reflected from the target location is directed to an optical path compensator 186 that adjusts the phase of the vertically polarized component to account for differences in the path lengths of the first optical path 166 and the second optical path 170. The path adjusted beam is then reflected from a second mirror 188 to align the beam with the third polarization beam splitter 184. Since the beam is vertically polarized, it reflects from the third polarization beam splitter 184 and is recombined with the horizontally polarized component. The recombined beam is then received at a detector 190, where one or more characteristics of the target location or the intervening atmosphere can be determined from the received light.

Figure 5:
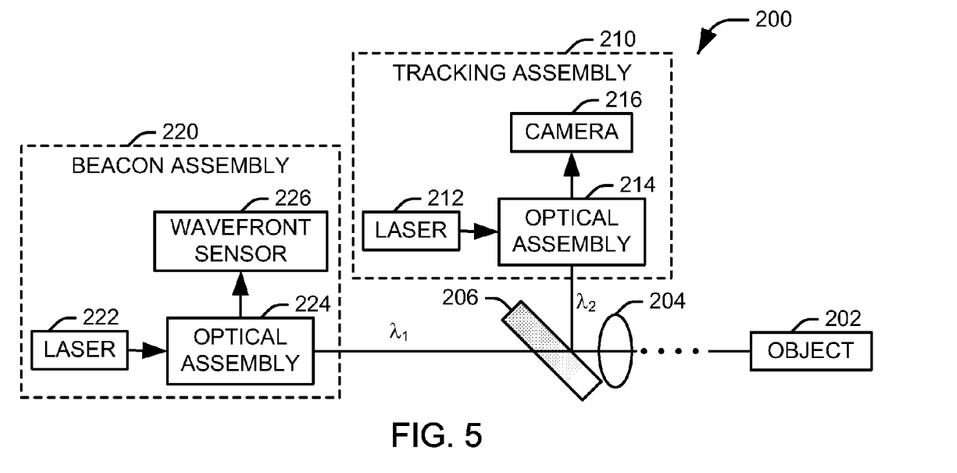
FIG. 5 illustrates an object tracking system in accordance with an aspect of the present invention.

FIG. 5 illustrates an object illumination system 200 in accordance with an aspect of the present invention. The illustrated object illumination system 200 locates and tracks an object of interest 202 at a tracking assembly 210, and estimates aberrations induced along the optical path to the target (e.g., due to atmospheric conditions and optical components) at a beacon assembly 220. In the illustrated implementation, the illumination system 200 is part of a laser weapon system that tracks the object of interest, determines a degree of aberrations in the optical path as part of an adaptive optics arrangement, and corrects the wavefront error by a deformable mirror and directs a high power laser (not shown) at the object of interest 202 to disable the tracked object. In accordance with an aspect of the present invention, the tracking assembly 210 and the beacon assembly 220 utilize light of two distinct wavelengths to allow for the use of a shared aperture 204. Specifically, a dichroic plate 206 can be used that is substantially transparent to light of a first wavelength and reflects light of a second wavelength. The dichroic plate 206 positioned behind the aperture in such a way as to separate light incident on the aperture by wavelength, allowing light of a first wavelength to pass through to the beacon assembly 220, and reflecting light of a second wavelength into the tracking assembly 210.

The tracking assembly 210 includes a tracking laser 212 that projects light of the second wavelength into a first optical assembly 214 in accordance with an aspect of the present invention. The first optical assembly 214 selectively polarizes the transmitted light, and directs the polarized light to the dichroic plate 206 via passive optical components. In the illustrated implementation, the first optical assembly 214 can comprise an assembly similar to that illustrated in FIG. 3. The projected light, having the second wavelength, reflected by the dichroic plate 206 into the aperture, where it is reflected from the object of interest 202.

The beacon assembly 220 includes an illuminator beacon laser 222 that projects light of the first wavelength into a second optical assembly 224 in accordance with an aspect of the present invention. The second optical assembly 224 selectively polarizes the transmitted light, and directs the polarized light to the dichroic plate 206 via passive optical components. In the illustrated implementation, the second optical assembly 224 can comprise an assembly similar to that illustrated in FIG. 4. The projected light, having the first wavelength, transmitted through the dichroic plate 206 into the aperture, where it is reflected from the object of interest 202.

Light from the tracking laser 212 and the illuminator beacon laser 222 reflected from object of interest 202 is received at the aperture 204 and directed to the dichroic plate 206. The reflected light from the tracking laser 212, having the second wavelength, reflects by the dichroic plate 206 into the first optical assembly 214. The first optical assembly 214 separates the light into horizontally and vertically polarized components and routes the polarized light separately as to avoid interference with the transmitted light from the tracking laser 212. The horizontally and vertically polarized light are then recombined and provided to a tracking camera 216. The tracking camera 216 can have associated image processing elements (not shown) that determine a position of the object of interest 202 from the image received at the tracking camera 216.

The transmitted light from the illuminator beacon laser 222, having the first wavelength, passes through the dichroic plate 206 into the second optical assembly 224. The second optical assembly 224 separates the light into horizontally and vertically polarized components and routes the polarized light separately as to avoid interference with the transmitted light from the illuminator beacon laser 222. The horizontally and vertically polarized light are then recombined and provided to a wavefront sensor 226. The wavefront sensor 226 determines optical aberrations experienced by the transmitted beacon light along the optical path to the object of interest 202. The determined aberrations can be used as part of an adaptive optics arrangement to precompensate for the aberrations during operation of the high power laser, increasing its effectiveness.

Figure 6:
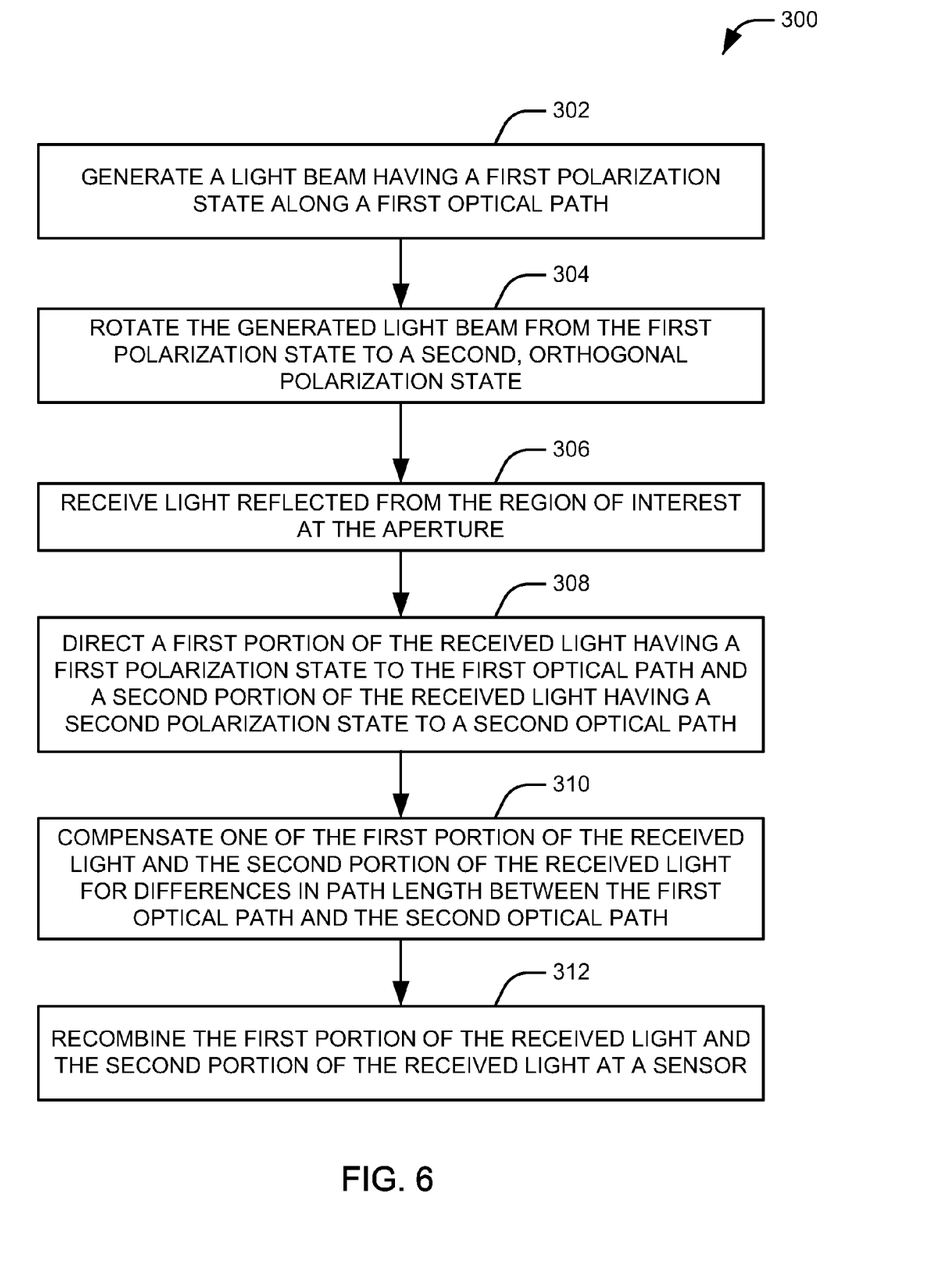
FIG. 6 illustrates a first method for imaging a region of interest in accordance with an aspect of the present invention.
Figure 7:
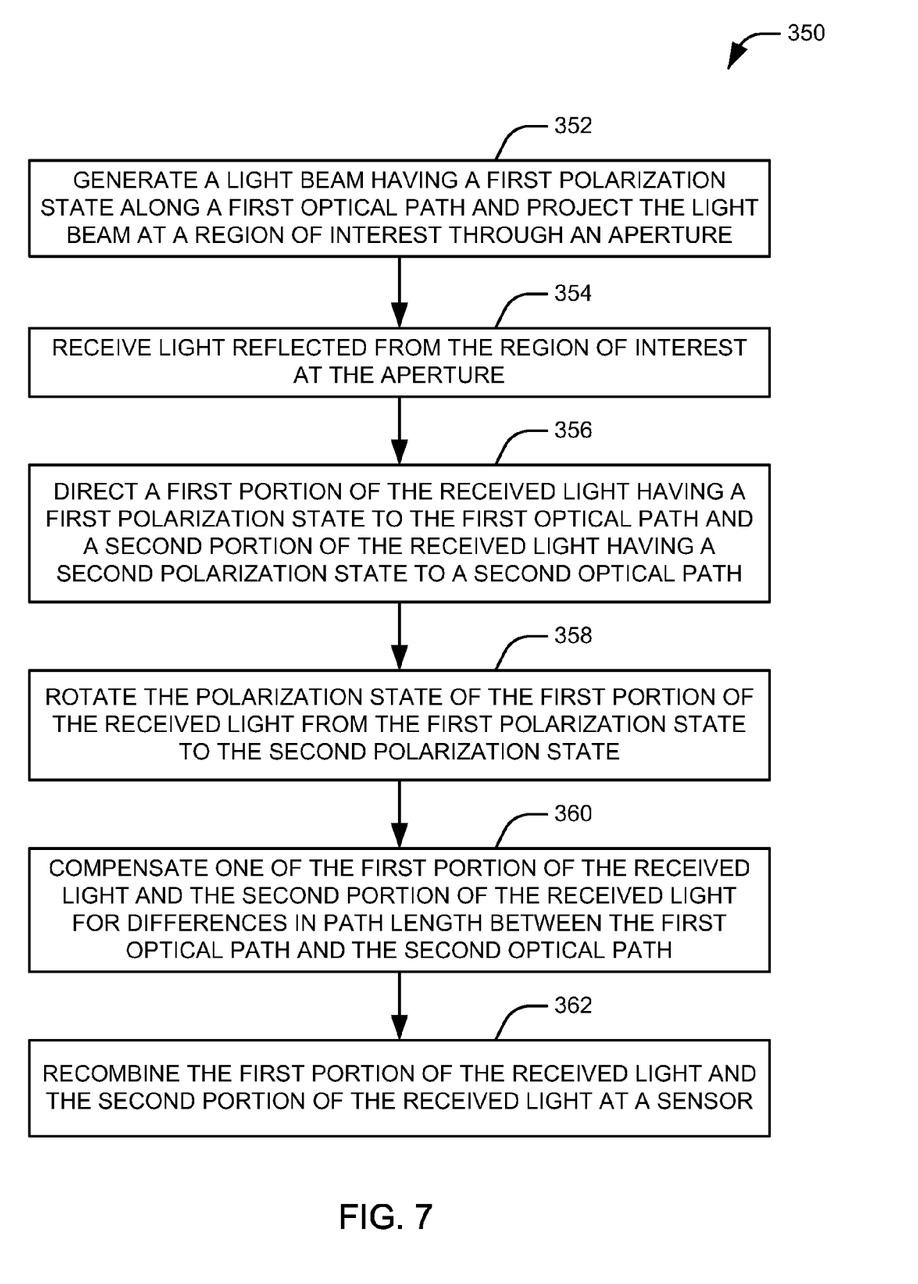
FIG. 7 illustrates a second method for imaging a region of interest in accordance with an aspect of the present invention

In view of the examples shown and described above, methodologies in accordance with the present invention will be better appreciated with reference to the flow diagrams of FIGS. 6 and 7. While, for purposes of simplicity of explanation, the methodologies are shown and described as executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention. Additionally, such methodologies can be implemented in hardware (e.g., one or more integrated circuits), software (e.g., running on a DSP or ASIC) or a combination of hardware and software.

FIG. 6 illustrates a method 300 that might be practiced, for example, with the system illustrated in FIG. 3, for imaging a region of interest in accordance with an aspect of the present invention. At 302, a light beam having a first polarization state is generated along a first optical path. At 304, the light beam is rotated at an optical polarization modulator and projected at the region of interest through an aperture. This is accomplished by passing the transmitted light through an optical polarization modulator, such that the polarization state of light transmitted through the first optical path is rotated to an orthogonal polarization state, while the polarization state of light received along the first optical path is unchanged. At 306, light reflected from the region of interest is received at the aperture.

The received light is split according to its polarization state at 308, as to direct a first portion of the received light having a second polarization state to the first optical path and to direct a second portion of the received light having a first polarization state to a second optical path. For example, the first polarization state can be a vertical polarization state and the second polarization can be a horizontal polarization state. At 310, one of the first portion of the received light and the second portion of the received light are compensated for differences in path length between the first optical path and the second optical path. The first portion of the received light and the second portion of the received light are then recombined at 312 and the combined light directed on a sensor.

FIG. 7 illustrates a method 350 that might be practiced, for example, with the system illustrated in FIG. 4, for imaging a region of interest in accordance with an aspect of the present invention. At 352, a light beam having a first polarization state is generated along a first optical path and projected at the region of interest through an aperture. At 354, light reflected from the region of interest is received at the aperture. The received light is split according to its polarization state at 356, as to direct a first portion of the received light having a first polarization state to the first optical path and to direct a second portion of the received light having a second polarization state to a second optical path. For example, the first polarization state can be a horizontal polarization state and the second polarization can be a vertical polarization state.

At 358, the polarization state of the first portion of the received light is rotated from a first polarization state to a second polarization state. In one implementation, this is accomplished by passing the received light through an optical polarization modulator, such that the polarization state of light transmitted through the first optical path is not changed, while the polarization state of light received along the first optical path is rotated to an orthogonal polarization state. At 360, one of the first portion of the received light and the second portion of the received light are compensated for differences in path length between the first optical path and the second optical path. The first portion of the received light and the second portion of the received light are then recombined at 362 and the combined light directed on a sensor.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. An apparatus for detecting a beam of light reflected from a region of interest, comprising:
    a light source that produces a light beam having a first polarization state;
    a first polarization beam splitter that directs the light beam along a first optical path, and allows light having a second polarization state, orthogonal to the first polarization state, to pass;
    an optical polarization modulator, located along the first optical path, that applies a net rotation of ninety degrees to the polarization of light passing through the optical polarization modulator in a first direction and applies a net rotation of zero degrees to the polarization of light passing through the optical polarization modulator in a second direction, the first polarization beam splitter directing the light beam through the optical polarization modulator to the region of interest;
    a second polarization beam splitter, positioned along the first optical path such that the optical polarization modulator is between the first polarization beam splitter and the second polarization beam splitter, that allows a first portion of the beam of light that is reflected from the region of interest having the second polarization state to pass to the optical polarization modulator and directs a second portion of the beam of light that is reflected from the region of interest having the first polarization state along a second optical path; and
    a third polarization beam splitter configured to allow light having the second polarization state to pass and reflect light having the first polarization state, the third polarization beam splitter being positioned as to combine light from the first optical path and light from the second optical path and direct the combined light onto a sensor.

2. The apparatus of claim 1, wherein the first polarization beam splitter, the optical polarization modulator, and the second polarization beam splitter are each implemented as respective assemblies comprising at least one passive optical component.

3. The apparatus of claim 1, wherein the first polarization state is a vertical polarization state and the second polarization state is a horizontal polarization state.

4. The apparatus of claim 1, the sensor comprising a photodetector array.

5. The apparatus of claim 1, the sensor comprising a wavefront sensor.

6. The apparatus of claim 1, further comprising a rotation element, positioned on the first optical path such that the first polarization beam splitter is located between the rotation element and the optical polarization modulator, that rotates the polarization of incident light.

7. The apparatus of claim 6, the third polarization beam splitter being oriented such that light from the first optical path is incident upon a first surface of the third polarization beam splitter at a first angle of incidence and light from the second optical path is incident upon a second surface of the third polarization beam splitter at a second angle of incidence, substantially orthogonal to the first angle of incidence.

8. The apparatus of claim 1, further comprising at least one phase compensation element that adjusts for differences in path length between the first optical path and the second optical path.

9. The apparatus of claim 1, the optical polarization modulator comprising a half wave plate and a Faraday rotator.

10. The apparatus of claim 1, wherein the region of interest comprises a target to be imaged by the apparatus.

11. An active imaging system for imaging a target of interest, comprising:
    a light source that generates a light beam that illuminates the target of interest;
    an optical assembly comprising:
        a first beam splitter that divides light reflected from the target of interest into a first beam having a first polarization and which is directed along a first optical path from the first beam splitter and a second beam having a second polarization that is orthogonal to the first polarization and is directed along a second optical path from the first beam splitter;
        a second beam splitter that recombines the first and second beams into a combined beam;
        a third beam splitter that directs the light beam having the first polarization along the first optical path and allows light having the second polarization to pass; and
        an optical polarization modulator, located along the first optical path, that applies a net rotation of zero degrees to the polarization of light passing through the optical polarization modulator in a first direction and applies a net rotation of ninety degrees to the polarization of light passing through the optical polarization modulator in a second direction as to convert light passing through the optical polarization modulator in the second direction from the first polarization to the second polarization, the third beam splitter directing the light beam onto the optical polarization modulator;
        wherein the first beam splitter is positioned along the first optical path such that the optical polarization modulator is between the first beam splitter and the third beam splitter and allows the first beam to pass to the optical polarization modulator and directs the second beam along the second optical path; and
    a sensor that detects the combined beam.

12. The system of claim 11, wherein the light source generates the light beam having the second polarization and projects the light beam on the optical assembly, the optical assembly directing the light beam along the first optical path.

13. The system of claim 11, the active imaging system comprising a laser weapon system that tracks the target of interest and directs a high power laser at the target of interest.

14. The system of claim 11, the imaging assembly comprising a first imaging assembly and the system further comprising:
- a second imaging assembly comprising:
  - a second light source;
  - a second optical assembly, comprising a plurality of passive optical components, that divides received light into a first beam, having a first polarization and a second beam, having a second, orthogonal polarization, directs the first and second beam along respective first and second optical paths within the second optical assembly, and recombines the first and second beams into a combined beam; and
  - a second sensor that detects the combined beam; and
- a dichroic plate, positioned at an aperture associated with the active imaging system, that reflects light of a first wavelength to the first imaging assembly and allows light of a second wavelength to pass through to the second imaging assembly.

* * * * *